(12) United States Patent
Mishima

(10) Patent No.: US 10,809,346 B2
(45) Date of Patent: Oct. 20, 2020

(54) SEMICONDUCTOR DEVICE, ULTRASONIC SENSOR, AND MOVING BODY

(71) Applicant: Rohm Co., Ltd., Kyoto (JP)

(72) Inventor: Kazuma Mishima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 135 days.

(21) Appl. No.: 16/021,144

(22) Filed: Jun. 28, 2018

(65) Prior Publication Data

US 2019/0004143 A1 Jan. 3, 2019

(30) Foreign Application Priority Data

Jun. 30, 2017 (JP) .................................. 2017-128554
May 21, 2018 (JP) .................................. 2018-097323

(51) Int. Cl.
*G01S 15/931* (2020.01)
*G01S 3/80* (2006.01)

(52) U.S. Cl.
CPC .............. *G01S 3/80* (2013.01); *G01S 15/931* (2013.01); *B60G 2400/823* (2013.01); *G01S 2015/932* (2013.01); *G01S 2015/938* (2013.01)

(58) Field of Classification Search
CPC .... G01S 15/931; G01S 3/80; G01S 2015/938; G01S 2015/932; G01S 2400/823
USPC ........................................................... 73/649
See application file for complete search history.

(56) References Cited

U.S. PATENT DOCUMENTS

| | | | | |
|---|---|---|---|---|
| 5,519,644 A | * | 5/1996 | Benton | G01K 1/026 374/132 |
| 5,638,005 A | * | 6/1997 | Rajan | G01R 31/305 324/73.1 |
| 5,917,776 A | * | 6/1999 | Foreman | H03K 17/94 340/568.1 |
| 2003/0035342 A1 | * | 2/2003 | Harrington | G01S 7/52026 367/127 |
| 2012/0095706 A1 | * | 4/2012 | Zhou | G01R 31/1209 702/58 |

FOREIGN PATENT DOCUMENTS

| | | |
|---|---|---|
| JP | 2015-055599 | 3/2015 |
| WO | WO2015037206 | * 3/2015 |

* cited by examiner

*Primary Examiner* — Jacques M Saint Surin
(74) *Attorney, Agent, or Firm* — Fish & Richardson P.C.

(57) ABSTRACT

A semiconductor device includes a burst signal generation unit arranged to generate a burst signal so as to supply the burst signal to a transmission unit that drives a piezoelectric element, a signal processing unit arranged to process a received signal received by the piezoelectric element or another piezoelectric element, and a resetting unit arranged to forcibly reset a filter in the signal processing unit.

11 Claims, 8 Drawing Sheets

SEMICONDUCTOR DEVICE, ULTRASONIC SENSOR, AND MOVING BODY

CROSS-REFERENCE TO RELATED APPLICATIONS

This nonprovisional application claims priority under 35 U.S.C. § 119(a) on Patent Application No. 2017-128554 filed in Japan on Jun. 30, 2017 and Patent Application No. 2018-097323 filed in Japan on May 21, 2018, the entire contents of which are hereby incorporated by reference.

BACKGROUND OF THE INVENTION

Field of the Invention

The present invention relates to performance improvement technology for an ultrasonic sensor.

Description of Related Art

There are commercialized ultrasonic sensors that detect presence or absence of an object and a distance to the object by transmitting an output wave signal in an ultrasonic range and by receiving a reflected wave signal thereof.

Note that as one example of a conventional technique related to the above description, there is one disclosed in JP-A-2015-55599, specifically in the paragraph 0043.

In general, in an ultrasonic sensor, after burst wave supply to a piezoelectric element is finished, vibration of the piezoelectric element continues for a certain period. This period is generally called a reverberation time.

In the conventional ultrasonic sensor, the reverberation time disables to detect presence or absence of an object near the sensor (short-distance object) and a distance to the short-distance object.

SUMMARY OF THE INVENTION

It is an object of the present invention to provide a semiconductor device capable of improving short-range detection performance of the ultrasonic sensor, and to provide an ultrasonic sensor and a moving body including the semiconductor device.

A semiconductor device disclosed in this specification includes a burst signal generation unit arranged to generate a burst signal so as to supply the burst signal to a transmission unit that drives a piezoelectric element, a signal processing unit arranged to process a received signal received by the piezoelectric element or other piezoelectric element, and a resetting unit arranged to forcibly reset a filter in the signal processing unit.

An ultrasonic sensor disclosed in this specification includes the semiconductor device having the structure described above and a piezoelectric element connected to the semiconductor device.

A moving body disclosed in this specification includes the ultrasonic sensor having the structure described above.

Meanings and effects of the present invention will become more apparent from the description of the embodiment given below. However, the following embodiment is merely one embodiment of the present invention, and the present invention and meanings of terms of structural elements are not limited to those described in the following embodiment.

DETAILED DESCRIPTION OF THE PREFERRED EMBODIMENTS

<Overall Structure of Ultrasonic Sensor>

Figure 1A:
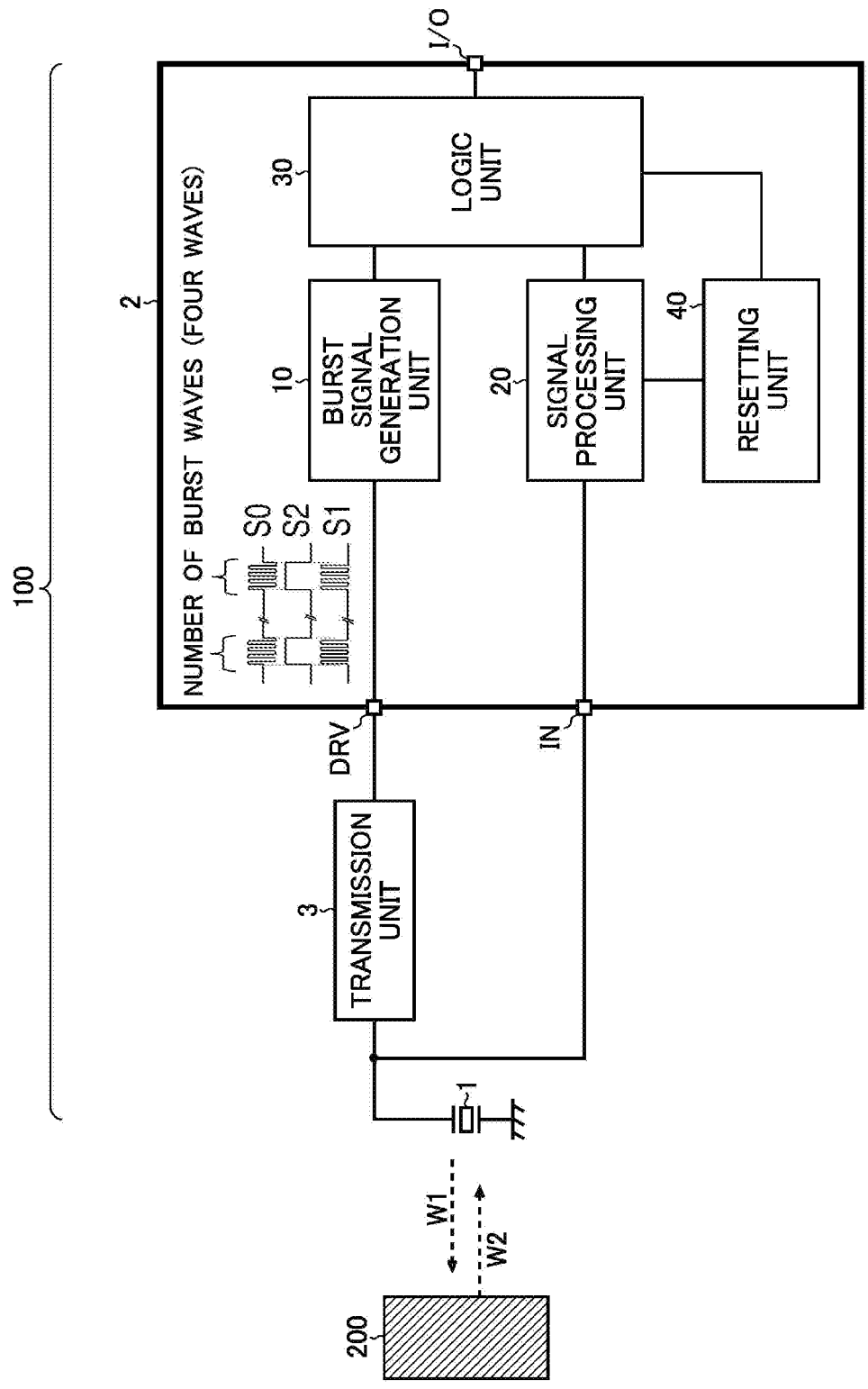
FIG. 1A is a diagram illustrating an overall structural example of an ultrasonic sensor.

FIG. 1A is a diagram illustrating an overall structural example of an ultrasonic sensor. An ultrasonic sensor 100 of this structural example is a proximity sensor (one type of an external sensor), which transmits an output wave signal W1 in an ultrasonic range (i.e. a frequency band inaudible to humans, which is generally 20 kHz or higher) toward the outside, and receives a reflected wave signal W2 thereof, so as to detect approach of an object 200 and to measure a distance thereto. The ultrasonic sensor 100 includes a piezoelectric element 1, a semiconductor device 2, and a transmission unit 3. Note that a drive frequency used for the proximity sensor is generally 30 to 80 kHz. The ultrasonic sensor 100 of this structural example is used as a corner sonar or a back sonar at a corner part of a bumper of a vehicle, for example (see FIG. 9 described later).

The piezoelectric element 1 has characteristics of generating mechanical displacement (vibration) in response to a voltage signal applied between terminals thereof, and it functions as a wave transmitter of the output wave signal W1. In addition, the piezoelectric element 1 has characteristics of generating electromotive force between the terminals in response to a mechanical displacement (vibration) applied to itself, and it also functions as a wave receiver of the reflected wave signal W2. Note that as a material of the piezoelectric element 1, perovskite type ceramic (such as barium titanate, lead titanate, or lead zirconate titanate) or the like can be appropriately used. During a period while a drive signal based on a burst signal S0 is applied to the piezoelectric element 1, vibration of an ultrasonic transducer of the piezoelectric element 1 continues, and after the application of the drive signal based on the burst signal S0 is stopped, a reverberation signal is generated. In addition, a transmitted ultrasonic signal is reflected by an obstacle, the ultrasonic transducer of the piezoelectric element 1 receives the reflected wave so as to vibrate, and then the piezoelectric element 1 converts it to the ultrasonic signal based on the reflected wave and outputs the same.

Figure 1B:
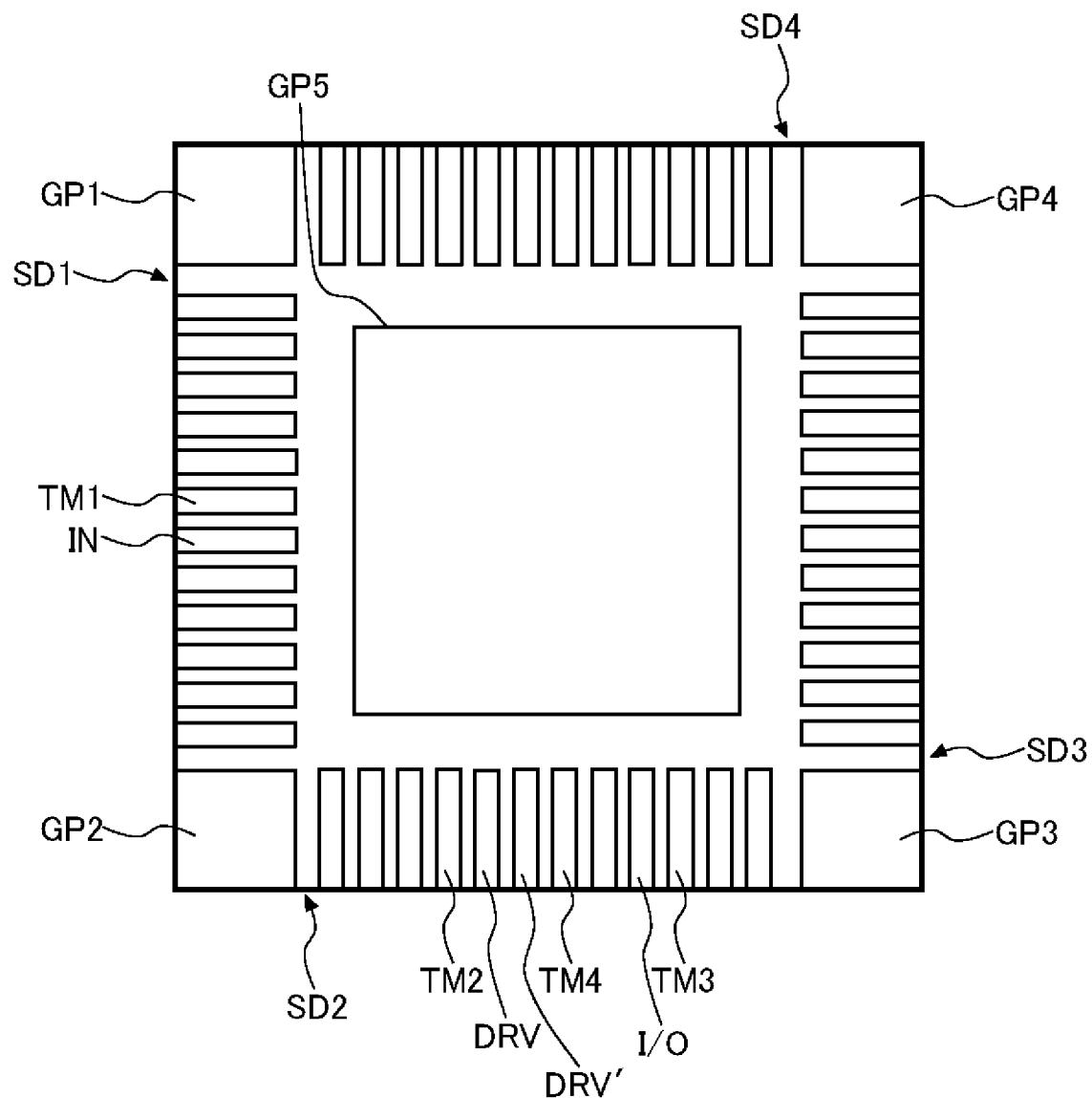
FIG. 1B is a schematic bottom view of a semiconductor device, illustrating a terminal arrangement.
Figure 1C:
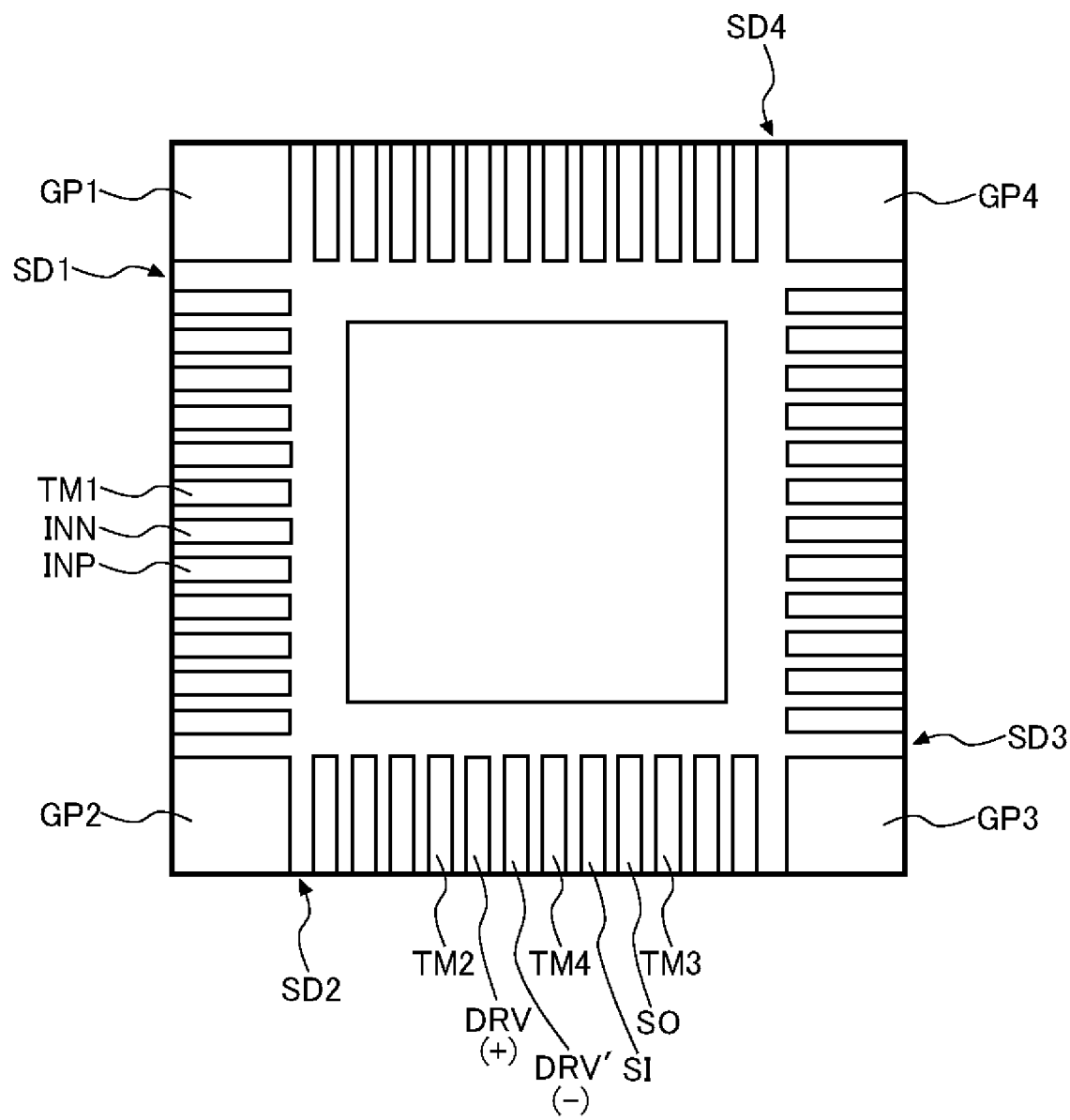
FIG. 1C is a schematic bottom view of the semiconductor device, illustrating a terminal arrangement.

The semiconductor device 2 is a main controller that performs the transmission operation of the output wave signal W1 using the piezoelectric element 1 and the transmission unit 3, and performs the receiving operation of the reflected wave signal W2 using the piezoelectric element 1. The semiconductor device 2 includes a burst signal generation unit 10, a signal processing unit 20, a logic unit 30, and a resetting unit 40. In addition, the semiconductor device 2, which establishes electric connection to the outside of the device, includes an output terminal DRV, an input terminal IN, and an input/output terminal I/O. The output terminal DRV is connected to one terminal of the piezoelectric element 1 via the transmission unit 3, and the input terminal IN is directly connected to the one terminal of the piezoelectric element 1. The other terminal of the piezoelectric element 1 is connected to a ground potential. A semiconductor package applied to the semiconductor device 2 is not limited to a particular one, and FIG. 1B exemplifies a case where a quad flat non-leaded package (QFN) is applied to the semiconductor device 2. FIG. 1B is a schematic bottom view of the semiconductor device 2 illustrating a terminal arrangement. Twelve terminals are disposed on each of four sides SD1 to SD4 of the semiconductor device 2 illustrated in FIG. 1B. In addition, ground pads GP1 to GP4 are respectively disposed at four corners of the semiconductor device 2 illustrated in FIG. 1B, and a ground pad GP5 is disposed at the center of the semiconductor device 2 illustrated in FIG. 1B. The input terminal IN and a terminal TM1 are disposed on the side SD1. Further, the input terminal IN and the terminal TM1 are disposed at the middle of the side SD1. The terminal TM1 is neighboring to the input terminal IN. The terminal TM1 is an analog ground terminal. In addition, other terminals are arranged between the terminal TM1 and the ground pad GP1, and other terminals are arranged between the input terminal IN and the ground pad GP2. The output terminal DRV, the input/output terminal I/O, a terminal TM2, a terminal TM3, and a terminal TM4 are arranged on the side SD2. The side SD2 is neighboring to the side SD1. The terminal TM2 is neighboring to the output terminal DRV on one side. The terminal TM2 is a driver ground terminal. A terminal DRV' is neighboring to the output terminal DRV on the other side. The terminal DRV' is connected to the other terminal of the piezoelectric element 1. In this example, the other terminal of the piezoelectric element 1 is connected to the terminal DRV'. The terminal DRV' is connected to the terminal TM2 inside the semiconductor device 2 and is connected to the ground via the terminal TM2. Note that the driver is an output stage of the burst signal generation unit 10. In addition, other terminals are arranged between the terminal TM2 and the ground pad GP2. The terminal TM3 is neighboring to the input/output terminal I/O. The terminal TM3 is a ground terminal for communication. Note that this communication is communication of the logic unit 30. In addition, other terminals are arranged between the terminal TM3 and the ground pad GP3. The output terminal DRV, the input/output terminal I/O, and the terminal TM4 are arranged between the terminal TM2 and the terminal TM3. Further, the terminal TM4 is disposed between the output terminal DRV and the input/output terminal I/O. The terminal TM4 inputs a power supply voltage (e.g. DC 12 V) that is used in the semiconductor device 2. In other words, the terminals RV and DRV' for driving the piezoelectric element 1 and the input/output terminal I/O of the logic unit 30 are arranged on the same side SD2, and are arranged between the terminal TM3 and the terminal TM2 that are connected to the ground. In addition, unlike this embodiment, if the burst signal generation unit 10 has a push-pull type output, so that the signal processing unit 20 receives positive and negative signals from the piezoelectric element 1, and that the communication of the logic unit 30 uses separate terminals for transmission and reception, then as illustrated in FIG. 1C, the output terminal DRV corresponds to a positive side output terminal, the output terminal DRV' corresponds to a negative side output terminal, a positive side input terminal INP and a negative side output terminal INN are disposed instead of the input terminal IN, and a received signal input terminal SI and a transmission signal output terminal SO are disposed instead of the input/output terminal I/O.

The burst signal generation unit 10 generates the burst signal S0 and supplies it to the transmission unit 3. The burst signal S0 is a signal in which a burst wave of a pulse, a triangular wave, a sine wave, or the like appears intermittently, for example. The burst signal S0 is generated based on a carrier wave S1 and a modulation wave S2. In other words, the burst signal S0 is an ultrasonic signal in which the carrier wave S1 is cut and generated intermittently at an interval of the modulation wave signal S2. The burst signal S0 has four voltage peaks, i.e. four waves as shown in FIG. 1A, for example. This state is expressed that the number of burst waves is four. The carrier wave S1 is a so-called ultrasonic oscillation having a high frequency of 20 kHz or higher, for example, that is inaudible to humans. The frequency of the carrier wave S1 used in this embodiment is 40 to 80 kHz, for example. The modulation wave S2 is a signal that modulates the carrier wave S1 and has a frequency of a few tens Hz, for example, which is lower than the frequency of the carrier wave S1 by approximately two orders. Note that the "burst wave" means a part of the burst signal S0, which is a signal component of the carrier wave S1. After receiving the burst signal S0 from the burst signal generation unit 10, the transmission unit 3 drives the piezoelectric element 1 based on the burst signal S0. In this way, the output wave signal W1 is output from the piezoelectric element 1.

The signal processing unit 20 processes the received signal received by the piezoelectric element 1. Note that the received signal also contains the ultrasonic signal component of the burst signal S0 transmitted from the transmission unit 3. In addition, one terminal of the piezoelectric element 1 is directly connected to the input terminal IN in this embodiment, but a receiving unit may be disposed between the one terminal of the piezoelectric element 1 and the input terminal IN. The receiving unit receives the ultrasonic signal converted by vibration of the ultrasonic transducer of the piezoelectric element 1 and transmits it to the signal processing unit 20. Note that the receiving unit may also have a function of cutting a DC signal component and largely attenuating a high frequency signal. By disposing the receiving unit, the receiving unit can transmits the ultrasonic signal determined by the entire transmitting and receiving unit to a circuit unit in the post stage, even if electric characteristics of the transmission unit 3 and the piezoelectric element 1 are changed. In this way, the signal processing unit 20 can securely perform signal processing according to use environment of the ultrasonic sensor.

In this way, in this structural example, the semiconductor device 2 is externally connected to the single piezoelectric element 1, and this piezoelectric element 1 is used as a wave transmitter and receiver by both the transmission unit 3 and the signal processing unit 20. In other words, the piezoelectric element 1 works both for transmission and for reception of the ultrasonic signal.

However, if another piezoelectric element separate from the piezoelectric element 1 is externally connected to the semiconductor device 2, the wave transmitter and the wave receiver can be prepared separately. In addition, if it is not necessary but reduction of external terminals should be given higher priority, the transmission unit 3 may be incorporated in the semiconductor device 2 so that the output terminal DRV and the input terminal IN are integrated as an input/output terminal, and in the semiconductor device 2, the input/output terminal may be connected to the transmission unit 3 and the signal processing unit 20 in parallel.

The logic unit 30 is a main controller that controls the transmission unit 10 and the receiving unit 20 when detecting approach of the object 200 and measuring a distance thereto (i.e. detecting whether or not there is an obstacle in the vicinity).

The resetting unit 40 forcibly resets a filter in the signal processing unit 20.

Note that results of the detection of approach of the object 200 and the measurement of a distance thereto obtained by the ultrasonic sensor 100 may be sequentially output to a processing device (such as a central processing unit (CPU)) to be a host, or may be stored in a register (not shown) so that the processing device can read at an arbitrary timing.

<Transmission Unit>

Figure 2:
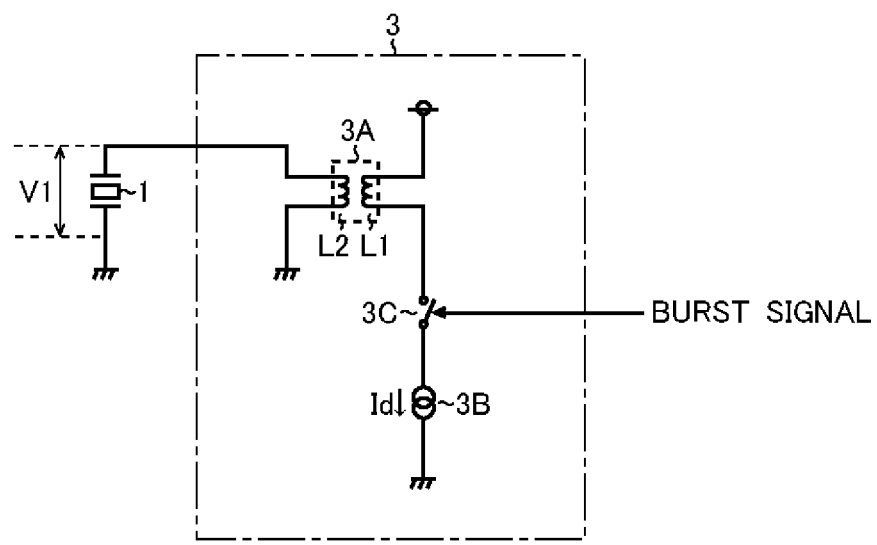
FIG. 2 is a diagram illustrating one structural example of the transmission unit.

FIG. 2 is a diagram illustrating one structural example of the transmission unit 3. The transmission unit 3 steps up the burst signal S0 to sufficiently large amplitude so that the piezoelectric element 1 can be sufficiently driven to vibrate. For example, it is stepped up to 80 Vpp. The transmission unit 3 of this structural example includes a transformer 3A, a current source 3B, and a switch 3C.

The transformer 3A includes a primary winding L1 and a secondary winding L2 that are electromagnetically coupled each other, and drives the piezoelectric element 1 connected across both terminals of the secondary winding L2 according to a drive current Id flowing in the primary winding L1. In this way, using the transformer 3A as amplifying means of the transmission unit 3, even if the power supply voltage supplied to the transmission unit 3 is not so high, a piezoelectric element voltage VI (i.e. a voltage applied across both terminals of the piezoelectric element 1) can be increased to a voltage value that can sufficiently drive the piezoelectric element 1.

The current source 3B, which is connected between the switch 3C and the ground terminal, generates the predetermined drive current Id.

The switch 3C, which is connected between the primary winding L1 of the transformer 3A and the current source 3B, turns on and off the drive current Id (i.e. connects and disconnects a current path in which the drive current Id flows, in the example of this diagram) according to the burst signal.

<Signal Processing Unit>

Figure 3:
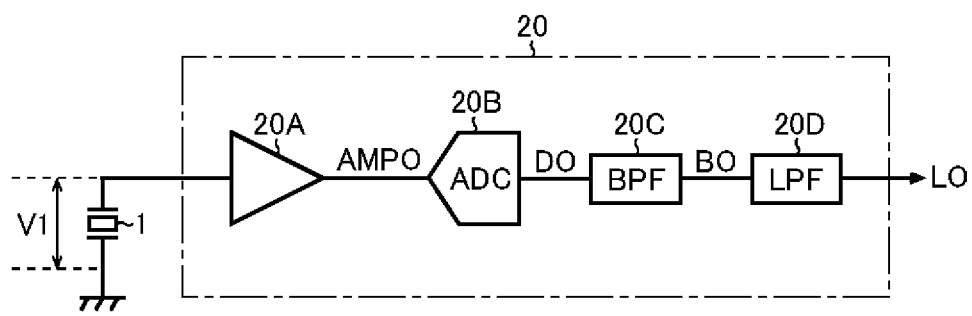
FIG. 3 is a diagram illustrating one structural example of a signal processing unit.

FIG. 3 is a diagram illustrating one structural example of the signal processing unit 20. The signal processing unit 20 of this structural example includes an amplifier 20A, an analog-to-digital (AD) converter 20B, a band-pass filter 20C, and a low-pass filter 20D.

The amplifier 20A amplifies the piezoelectric element voltage VI (i.e. corresponding to an input wave signal) so as to generate an amplified output signal AMPO. Note that as the amplifier 20A, a programmable gain amplifier (PGA) or the like that can arbitrarily adjust its gain can be appropriately used. A voltage amplification degree of the amplifier 20A is appropriately set within a range of 20 to 100 dB, for example, based on amplitude of the received signal.

The AD converter 20B operates at a predetermined sampling frequency (e.g. 1 MHz) so as to convert the analog amplified output signal AMPO into a digital output signal DO. Note that if the ultrasonic signal is processed in analog form by the signal processing unit 20, the AD converter 20B and the band-pass filter 20C are not necessary.

The band-pass filter 20C is a digital filter that limits band of the digital output signal DO, while the low-pass filter 20D is a digital filter that removes a high frequency component in an output signal BO of the band-pass filter 20C. An output signal LO of the low-pass filter 20D (i.e. the output signal of the signal processing unit 20) is compared with a threshold value in the logic unit 30. The logic unit 30 detects approach of the object 200 and measures a distance thereto based on a result of the comparison between the output signal LO of the low-pass filter 20D and the threshold value.

<Resetting Unit>

The resetting unit 40 of this example forcibly resets the band-pass filter 20C after a predetermined time elapses from generation start timing of the burst wave contained in the burst signal. When the band-pass filter 20C is reset, the output signal of the band-pass filter 20C is also reset.

The burst signal generation unit 10 generates the burst signal based on control of the logic unit 30. Therefore the logic unit 30 knows the generation start timing of the burst wave contained in the burst signal. Therefore in this example, the resetting unit 40 receives information about the generation start timing of the burst wave contained in the burst signal from the logic unit 30.

An appropriate value of the predetermined time described above is different for each ultrasonic sensor 100 depending on variation in characteristics of the ultrasonic sensor 100. Therefore the appropriate value of the predetermined time described above is determined for each ultrasonic sensor 100 by an evaluation test or the like, and the appropriate value is stored in a nonvolatile memory (not shown) in the resetting unit 40. The writing of data in the nonvolatile memory is performed via the logic unit 30, for example.

The appropriate value of the predetermined time described above is period from the generation start timing of the burst wave contained in the burst signal to timing when the output signal of the signal processing unit 20 starts to decrease in the reverberation time.

It is preferred that the timing when the output signal of the signal processing unit 20 starts to decrease in the reverberation time should be timing such that an output signal value of the signal processing unit 20 is within a range of 40% to 70% of the maximum value of the output signal of the signal processing unit 20, for example. It is because if the band-pass filter 20C is reset when the output signal value of the signal processing unit 20 is larger than 70% of the maximum value of the output signal of the signal processing unit 20, the reverberation signal may not be discriminated from the reflected wave signal after the band-pass filter 20C is reset. Further, it is because if the band-pass filter 20C is reset when the output signal value of the signal processing unit 20 is smaller than 40% of the maximum value of the output signal of the signal processing unit 20, there is little expectation of improvement in short-range detection performance of the ultrasonic sensor 100. It is more preferred that the timing when the output signal of the signal processing unit 20 starts to decrease in the reverberation time should be timing when the output signal value of the signal processing unit 20 becomes approximately 50% of the maximum value of the output signal of the signal processing unit 20.

FIGS. 4 to 7 are timing charts schematically showing the output signal of the signal processing unit 20.

Figure 4:
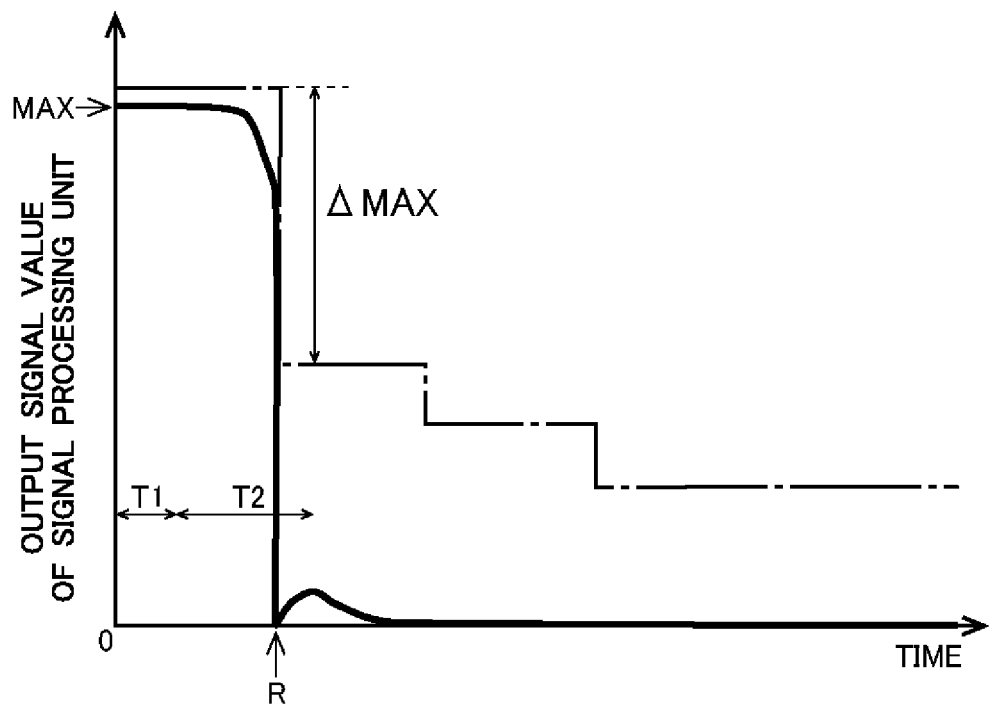
FIG. 4 is a timing chart schematically showing an output signal of the signal processing unit (with resetting and without an object).
Figure 5:
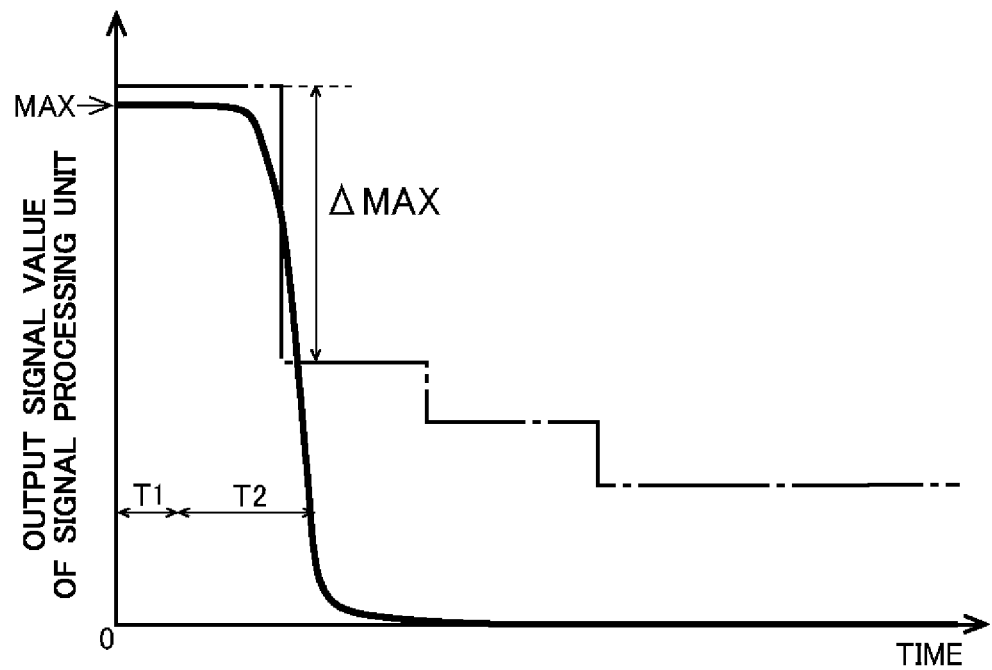
FIG. 5 is a timing chart schematically showing the output signal of the signal processing unit (without resetting and without an object).

FIG. 4 is a timing chart in a case where there is no object 200 that reflects the output wave signal W1 in a state where the resetting unit 40 is operated. FIG. 5 is a timing chart in a case where there is no object 200 that reflects the output wave signal W1 in a state where the resetting unit 40 is not operated (comparative example).

Figure 6:
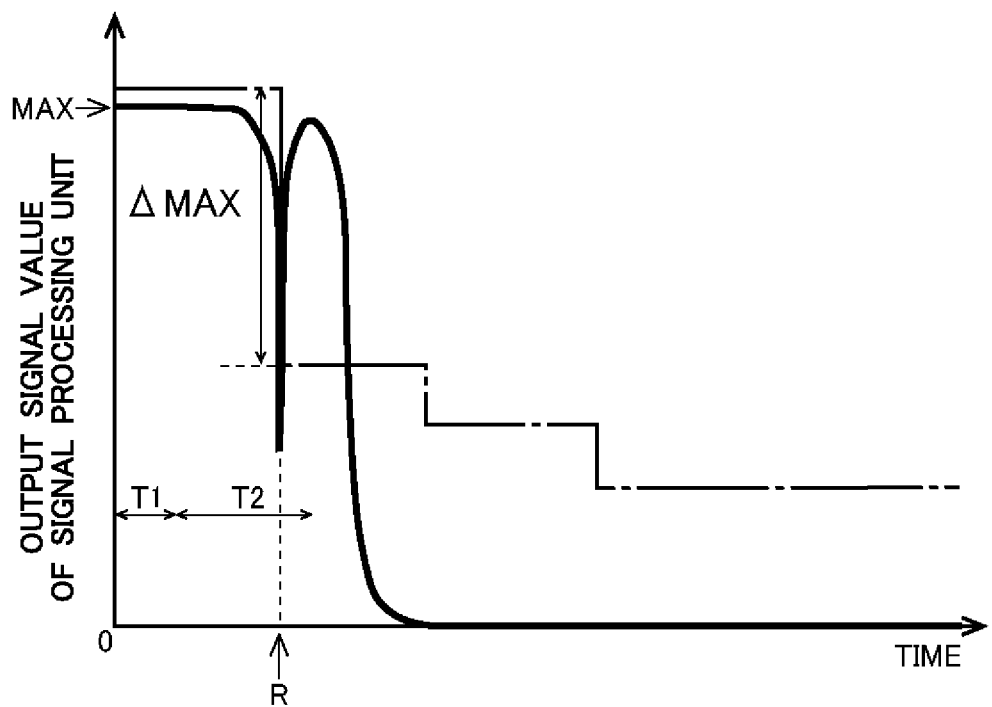
FIG. 6 is a timing chart schematically showing the output signal of the signal processing unit (with resetting and with an object).
Figure 7:
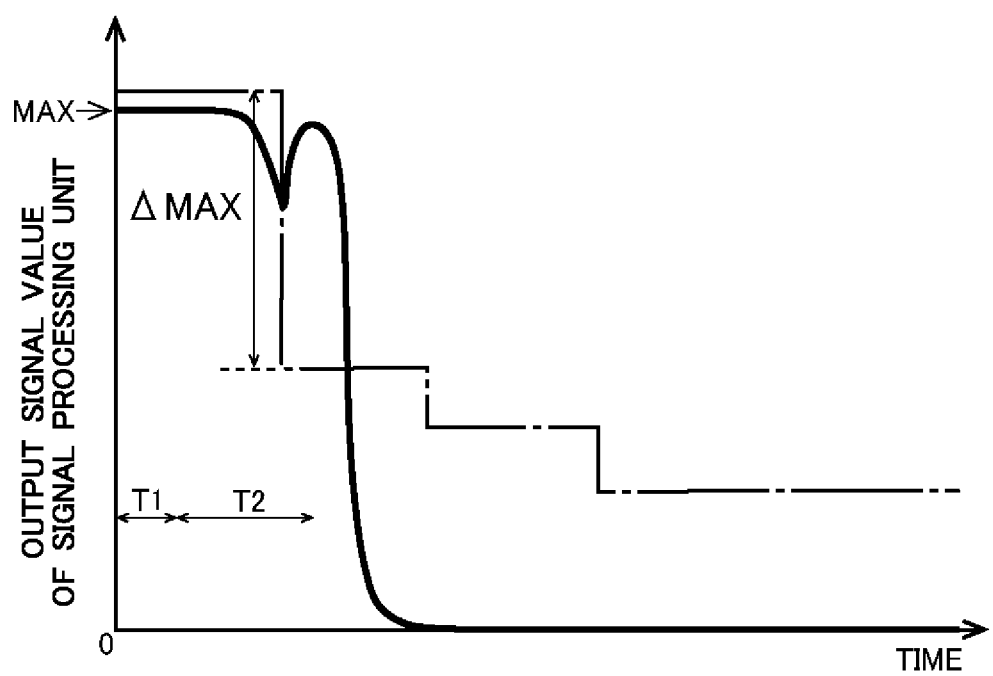
FIG. 7 is a timing chart schematically showing the output signal of the signal processing unit (without resetting and with an object).

FIG. 6 is a timing chart in a case where there is an object 200 that reflects the output wave signal W1 near the ultrasonic sensor 100 in a state where the resetting unit 40 is operated. FIG. 7 is a timing chart in a case where there is an object 200 that reflects the output wave signal W1 near the ultrasonic sensor 100 in a state where the resetting unit 40 is not operated (comparative example).

In FIGS. 4 to 7, MAX indicates the maximum value of the output signal of the signal processing unit 20. In FIGS. 4 and 6, R indicates timing when the resetting unit 40 resets the band-pass filter 20C.

In FIGS. 4 to 7, T1 indicates period in which the burst wave is generated. In FIGS. 4 to 7, T2 indicates the reverberation time.

In FIGS. 4 to 7, a dot-dashed line indicates a threshold value that is compared with the output signal of the signal processing unit 20 by the logic unit 30. The data about the threshold value is stored in the logic unit 30 in a nonvolatile manner.

The threshold value is set so as to decrease step by step as time elapses from the generation start of the burst wave contained in the burst signal. As time elapses from the generation start of the burst wave contained in the burst signal, the object 200 detected by the ultrasonic sensor 100 is apart from the ultrasonic sensor 100, because the reflected wave signal W2 reaching the ultrasonic sensor 100 is attenuated. Note that unlike this embodiment, the threshold value may be smoothly decreased as time elapses from the generation start of the burst wave contained in the burst signal.

In FIGS. 4 to 7, AMAX indicates a maximum decrease of the threshold value. In this example, just after the resetting unit 40 forcibly resets the band-pass filter 20C, the logic unit 30 decreases the threshold value with the maximum decrease. In other words, in this example, just after the resetting unit 40 forcibly resets the band-pass filter 20C, the threshold value is decreased by the maximum decrease AMAX. In this way, even if the object 200 near the ultrasonic sensor 100 reflects the output wave signal W1 with low reflectance, the ultrasonic sensor 100 can appropriately detect the object 200.

Because the resetting unit 40 resets the band-pass filter 20C, presence or absence of the object 200 and a distance to the object 200 can be detected just after the band-pass filter 20C is reset (see FIGS. 4 and 6). In other words, because the resetting unit 40 resets the band-pass filter 20C, short-range detection performance of the ultrasonic sensor 100 can be improved.

Because the ultrasonic sensor 100 can detect presence or absence of the object 200 and a distance to the object 200 just after the band-pass filter 20C is reset, the logic unit 30 starts detection of the object 200 based on the output signal of the signal processing unit 20 just after the band-pass filter 20C is reset. By disabling the detection of the object 200 based on the output signal of the signal processing unit 20 until the band-pass filter 20C is reset, it is possible to prevent misdetection of the object 200.

On the other hand, like the comparative example, if the resetting unit 40 does not reset the band-pass filter 20C, the reverberation signal cannot be discriminated from the reflected wave signal before the reverberation signal becomes sufficiently small (see FIGS. 5 and 7). In other words, if the resetting unit 40 does not reset the band-pass filter 20C like the comparative example, presence or absence of a short-distance object and a distance to the short-distance object cannot be detected because of the reverberation time.

<Other Overall Structure of Ultrasonic Sensor>

The reverberation signal contained in the output signal of the signal processing unit 20 has temperature characteristics. In consideration of the temperature characteristics of the reverberation signal, the ultrasonic sensor 100 may be configured as illustrated in FIG. 8.

Figure 8:
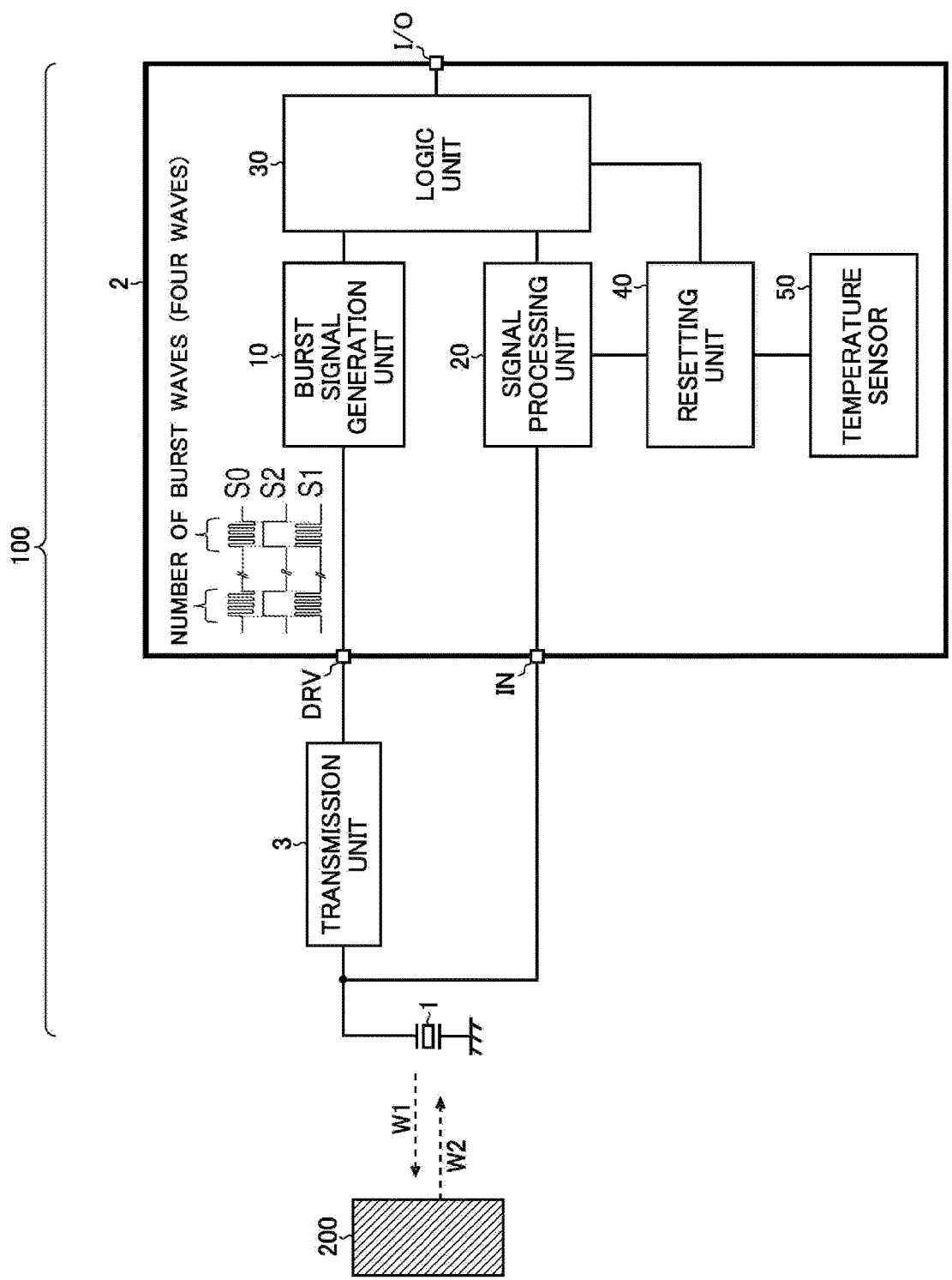
FIG. 8 is a diagram illustrating another overall structural example of the ultrasonic sensor.

The ultrasonic sensor 100 illustrated in FIG. 8 has a structure in which a temperature sensor 50 is added to the ultrasonic sensor 100 illustrated in FIG. 1A. The temperature sensor 50 is disposed inside the semiconductor device 2. As the temperature sensor 50, it is possible to use a temperature detection circuit, which utilizes temperature characteristics of a semiconductor element, for example, so as to detect a temperature. In addition, unlike the structural example illustrated in FIG. 8, the temperature sensor may be disposed outside the semiconductor device 2 and near the semiconductor device 2, so that an output of the temperature sensor can be received by the semiconductor device 2. As the temperature sensor disposed outside the semiconductor device 2 and near the semiconductor device 2, a thermocouple can be used, for example.

In the ultrasonic sensor 100 illustrated in FIG. 8, the nonvolatile memory (not shown) in the resetting unit 40 stores table data indicating a relationship between an appropriate value of the predetermined time described above and temperature detected by the temperature sensor 50, or a relational expression indicating the relationship between the appropriate value of the predetermined time described above and the temperature detected by the temperature sensor 50, so that the resetting unit 40 resets the band-pass filter 20C using the appropriate value of the predetermined time corresponding to the temperature detected by the temperature sensor 50. In this way, in the ultrasonic sensor 100 illustrated in FIG. 8, even if a temperature condition changes, there is no problem in improvement of the short-range detection performance.

Note that the reverberation signal contained in the output signal of the signal processing unit 20 may have aging characteristics. The aging characteristics of the reverberation signal may be considered instead of or in addition to the temperature characteristics of the reverberation signal.

The aging characteristics of the reverberation signal are determined from an experiment or a simulation. The nonvolatile memory (not shown) in the resetting unit 40 stores table data indicating a relationship between the appropriate value of the predetermined time described above and elapsed time after production completion of the ultrasonic sensor 100 or accumulated use time of the ultrasonic sensor 100, or a relational expression indicating the relationship between the appropriate value of the predetermined time described above and elapsed time after production completion of the ultrasonic sensor 100 or accumulated use time of the ultrasonic sensor 100. Further, the resetting unit 40 resets the band-pass filter 20C using the appropriate value of the predetermined time corresponding to the elapsed time after production completion of the ultrasonic sensor 100 or the accumulated use time of the ultrasonic sensor 100 measured by a timekeeping unit or the like disposed in the signal processing unit 20.

Which one of the elapsed time after production completion of the ultrasonic sensor 100 and the accumulated use time of the ultrasonic sensor 100 should be used is determined in consideration of a result of the experiment or the simulation of the aging characteristics of the reverberation signal.

<Vehicle Sonar>

Figure 9:
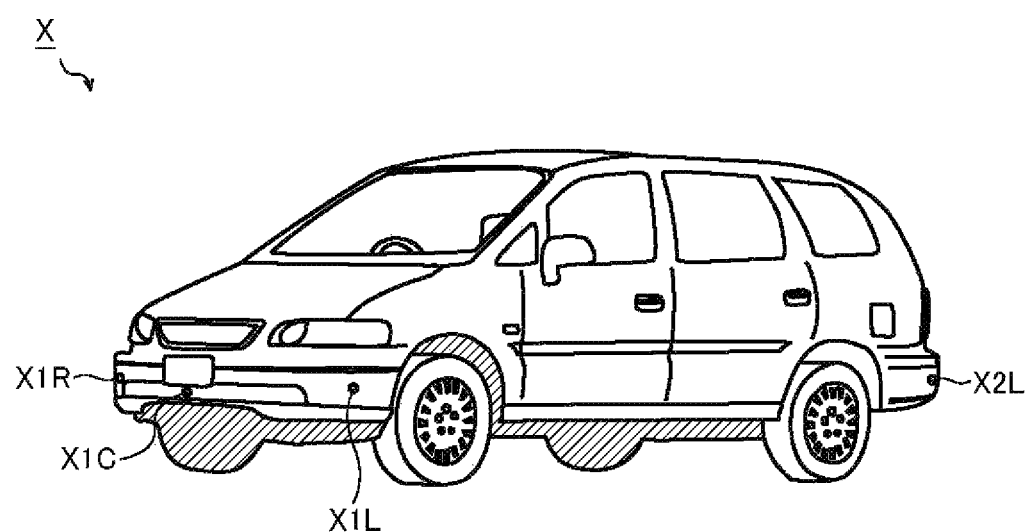
FIG. 9 is an external view of a vehicle.

FIG. 9 illustrates an external view of a vehicle. A front bumper of a vehicle X is equipped with front sonars X1L, X1R and X1C at left, right and center, respectively. In addition, a rear bumper of the vehicle X is equipped with back sonars X2L, X2R and X2C at left, right and center, respectively (though the back sonars X2R and X2C are not shown for convenience sake of illustration).

In this way, with the front sonars X1L, X1R and X1C, and the back sonars X2L, X2R and X2C mounted on the vehicle X, it is possible to detect approach of an object (such as an obstacle, another vehicle, or a pedestrian) around the vehicle X, and to measure a distance thereto, so as to support safe drive by a driver.

Note that the ultrasonic sensor 100 described above can be used as the front sonars X1L, X1R and X1C and the back sonars X2L, X2R and X2C.

<Other Variations>

In the embodiment described above, the resetting unit 40 forcibly resets the band-pass filter 20C after a predetermined time elapses from the generation start timing of the burst wave contained in the burst signal, but the resetting unit 40 may be configured to forcibly reset the band-pass filter 20C when the output signal of the signal processing unit 20 is decreased to a predetermined value.

For example, preferably, the logic unit 30 determines whether or not the output signal of the signal processing unit 20 is decreased to a predetermined value, and the resetting unit 40 receives a result of the determination from the logic unit 30. The predetermined value is preferred to be within 40% to 70% of the maximum value of the output signal of the signal processing unit 20, and is more preferred to be approximately 50% of the maximum value of the output signal of the signal processing unit 20.

In the case where the resetting unit 40 forcibly resets the band-pass filter 20C when the output signal of the signal processing unit 20 is decreased to the predetermined value, the band-pass filter 20C can be reset according to the temperature characteristics or aging characteristics of the reverberation signal, without using a temperature sensor or a timekeeping unit.

In addition, the embodiment described above exemplifies the case where the ultrasonic sensor 100 is used as a vehicle sonar, but the application of the ultrasonic sensor 100 is not limited to this. The ultrasonic sensor 100 may be mounted in other moving body (such as a drone).

In addition, the ultrasonic sensor 100 may be mounted not in a moving body but in a fixed object. Therefore the ultrasonic sensor 100 can be widely applied to, for example, a parking management system in which the ultrasonic sensor 100 is disposed at each parking space, a humidity sensor, a snow depth meter, an object detector for a belt conveyor, a liquid amount detector for tank water injection, a human body sensor for an automatic door or an intrusion monitoring device, or various types of displacement measuring instruments.

In this way, the various technical features disclosed in this specification can be variously modified other than the embodiment described above within the scope of the technical invention without deviating the spirit thereof. In other words, the embodiment described above is merely an example in every aspect and should not be interpreted as a limitation. The technical scope of the present invention is defined not by the above description of the embodiment but by the claims, and should be understood to include all modifications within meaning and scope equivalent to the claims.

The ultrasonic sensor disclosed in the specification can be used as an external sensor of a vehicle, for example.

<Summary>

The semiconductor device described above includes a burst signal generation unit arranged to generate a burst signal so as to supply the burst signal to a transmission unit that drives a piezoelectric element, a signal processing unit arranged to process a received signal received by the piezoelectric element or another piezoelectric element, and a resetting unit arranged to forcibly reset a filter in the signal processing unit (first structure).

In addition, the semiconductor device of the first structure may have a structure in which detection of an object based on the received signal is started just after the resetting unit forcibly resets the filter (second structure).

In addition, the semiconductor device of the first or second structure may have a structure in which the resetting unit forcibly resets the filter after a predetermined time elapses from generation start timing of a burst wave contained in the burst signal (third structure).

In addition, the semiconductor device of the third structure may have a structure in which the resetting unit changes the predetermined time according to an output signal of a temperature sensor disposed inside the semiconductor device or in vicinity of the semiconductor device (fourth structure).

In addition, the semiconductor device of the fourth structure may include the temperature sensor (fifth structure).

In addition, the semiconductor device of the first or second structure may have a structure in which the signal processing unit generates a signal to be compared with a threshold value used for detecting an object based on the received signal, by processing the received signal, and the resetting unit forcibly resets the filter when the signal to be compared with the threshold value used for detecting an object based on the received signal is decreased to a predetermined value (sixth structure).

In addition, the semiconductor device of the sixth structure may have a structure in which the predetermined value is 40% to 70% of a maximum value of the signal to be compared with the threshold value used for detecting an object based on the received signal (seventh structure).

In addition, the semiconductor device of any one of the first to seventh structures may have a structure in which the threshold value used for detecting an object based on the received signal is decreased with a maximum decrease just after the resetting unit forcibly resets the filter (eighth structure).

In addition, the semiconductor device of any one of the first to eighth structures may have a structure in which the semiconductor device is a semiconductor package having a rectangular shape in a bottom view, and an input terminal that inputs the received signal and an analog ground terminal are disposed in the middle of a first side of the rectangular shape (ninth structure).

In addition, the semiconductor device of any one of the first to ninth structures may have a structure in which the semiconductor device is a semiconductor package having a rectangular shape in a bottom view, and a terminal that drives the piezoelectric element and a terminal for communication with outside are disposed in the middle of a second side of the rectangular shape, between two terminals connected to a ground (tenth structure).

In addition, the ultrasonic sensor described above includes the semiconductor device of any one of the first to tenth structures, and a piezoelectric element connected to the semiconductor device (eleventh structure).

In addition, the moving body described above includes the ultrasonic sensor of the eleventh structure (twelfth structure).

What is claimed is:

1. A semiconductor device comprising:
   a burst signal generation unit arranged to generate a burst signal so as to supply the burst signal to a transmission unit that drives a piezoelectric element;
   a signal processing unit arranged to process a received signal received by the piezoelectric element or another piezoelectric element; and
   a resetting unit arranged to forcibly reset a filter in the signal processing unit,
   wherein the resetting unit forcibly resets the filter after a predetermined time elapses from generation start timing of a burst wave contained in the burst signal.

2. The semiconductor device according to claim 1, wherein detection of an object based on the received signal is started just after the resetting unit forcibly resets the filter.

3. The semiconductor device according to claim 1, wherein the resetting unit changes the predetermined time according to an output signal of a temperature sensor disposed inside the semiconductor device or in vicinity of the semiconductor device.

4. The semiconductor device according to claim 3, comprising the temperature sensor.

5. The semiconductor device according to claim 1, wherein the semiconductor device is a semiconductor package having a rectangular shape in a bottom view, and an input terminal that inputs the received signal and an analog ground terminal are disposed in the middle of a first side of the rectangular shape.

6. The semiconductor device according to claim 1, wherein the semiconductor device is a semiconductor package having a rectangular shape in a bottom view, and a terminal that drives the piezoelectric element and a terminal for communication with outside are disposed in the middle of a second side of the rectangular shape, between two terminals connected to a ground.

7. An ultrasonic sensor comprising:
   the semiconductor device according to claim 1; and
   a piezoelectric element connected to the semiconductor device.

8. A moving body comprising the ultrasonic sensor according to claim 7.

9. A semiconductor device comprising:
   a burst signal generation unit arranged to generate a burst signal so as to supply the burst signal to a transmission unit that drives a piezoelectric element
   a signal processing unit arranged to process a received signal received by the piezoelectric element or another piezoelectric element and
   a resetting unit arranged to forcibly reset a filter in the signal processing unit,
   wherein the signal processing unit is configured to decrease a threshold value used in detection of an object based on the received signal as time elapses from a generation start timing of a burst wave contained in the burst signal.

10. The semiconductor device according to claim 9, wherein
    the signal processing unit generates a signal to be compared with the threshold value used for detecting an object based on the received signal, and
    the resetting unit forcibly resets the filter when the signal to be compared with the threshold value used for detecting an object based on the received signal is decreased to a predetermined value.

11. The semiconductor device according to claim 10, wherein the threshold value used for detecting an object based on the received signal is decreased with a maximum decrease just after the resetting unit forcibly resets the filter.

* * * * *